Fig. 2.

Inventor,
Edwin E. Foster

Nov. 26, 1940.                E. E. FOSTER                 2,223,100
                        INTERNAL COMBUSTION ENGINE
                    Filed April 1, 1938         10 Sheets-Sheet 3

Inventor;
Edwin E. Foster
By Young, Emery & Thompson
Attys.

Nov. 26, 1940.  E. E. FOSTER  2,223,100
INTERNAL COMBUSTION ENGINE
Filed April 1, 1938  10 Sheets-Sheet 5

Inventor,
Edwin E. Foster
By Young, Emery & Thompson
Attys.

Nov. 26, 1940.  E. E. FOSTER  2,223,100
INTERNAL COMBUSTION ENGINE
Filed April 1, 1938  10 Sheets-Sheet 6

Fig. 9.

Inventor,
Edwin E. Foster
By Young, Emery & Thompson
Attys.

Nov. 26, 1940.  E. E. FOSTER  2,223,100
INTERNAL COMBUSTION ENGINE
Filed April 1, 1938  10 Sheets-Sheet 9

Inventor;
Edwin E. Foster
By
Attys.

Patented Nov. 26, 1940

2,223,100

UNITED STATES PATENT OFFICE 2,223,100

INTERNAL COMBUSTION ENGINE

Edwin E. Foster, Austin, Tex.

Application April 1, 1938, Serial No. 199,520

3 Claims. (Cl. 74—52)

The present invention relates to an internal combustion engine which is not only capable of being built as a radial type but also in opposite alignment relative to the pistons and cylinders and suitable for both two and four cycle operation. It is an object of this invention to provide a motor which is very compact and extremely powerful in proportion to its weight. A further object is to eliminate all side thrust between the piston and the cylinder walls. Still further objects include the provision of the two-cycle operation in order to increase the number of power strokes per revolution of the crank shaft with a minimum weight. The radial design eliminates certain bearings and also entirely eliminates all "whip" action on the connecting rods.

The drawings illustrate a number of different forms of a radial engine of both the two and four cycle type but the invention is of course readily adaptable to an arrangement where the cylinders are in line or opposed. Furthermore, certain arrangements can readily be used in the compressor and pump fields such as 2-stage compression by utilizing both sides of the piston.

The engine illustrated in Figs. 1 to 8 includes eight cylinders 1 (Fig. 1) on each of which is provided a plurality of cooling fins 2 and a spark plug 3. A piston 4 reciprocates in each cylinder and a piston rod 5 secured to the piston also reciprocates without any swinging motion of any kind. A stuffing box 6 is provided for each piston rod in order to tightly seal each cylinder from the crank case chamber 7 as confined by the crank casing 8. Each cylinder 1 also has an inlet port 9, a compression chamber 10, a communicating channel 11, an explosion chamber 12 and an exhaust port 13.

Figure 1:
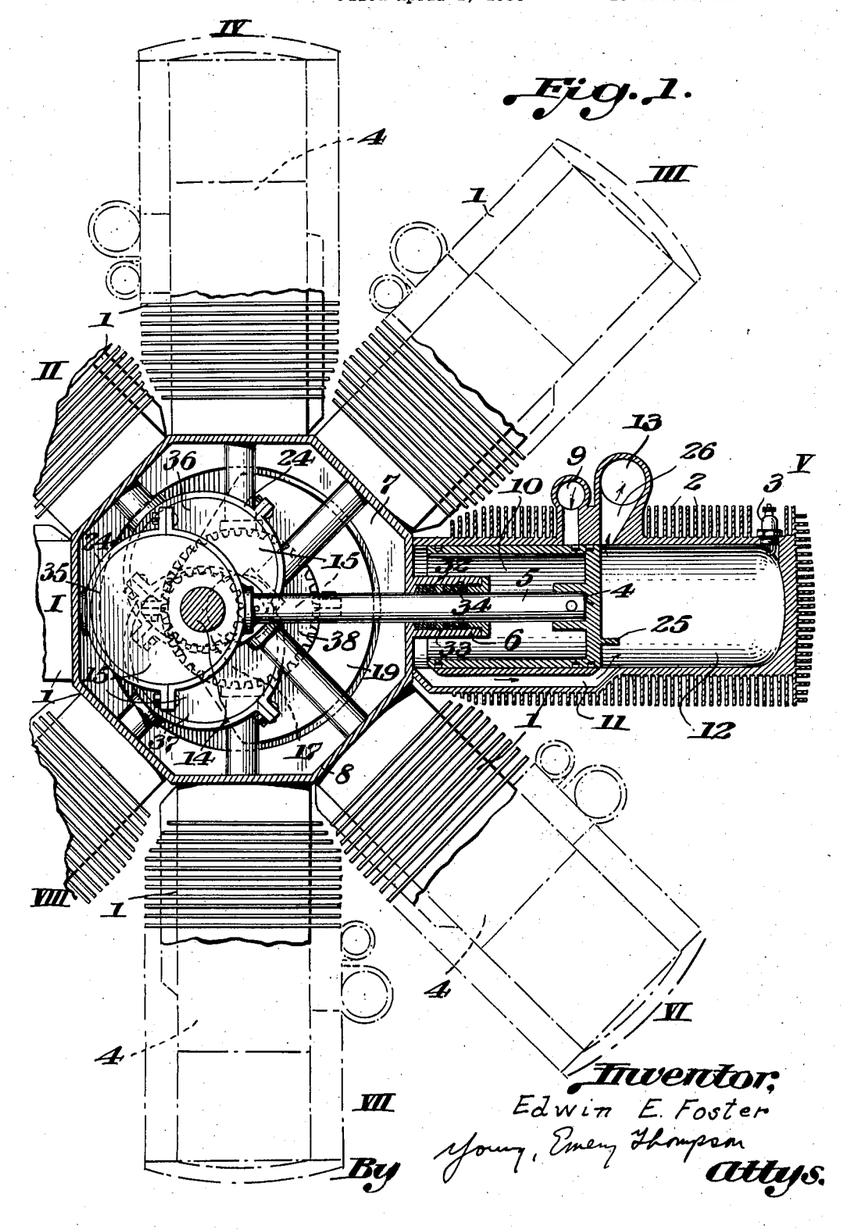
Figure 1 is a front view of a two-cycle engine with certain parts in section.

The crank shaft 14 is off center as seen in Fig. 1 and a plurality of eccentrics 15 are mounted thereon by means of a sleeve 16. There is a cluster of four eccentrics 15 and these rotate with the sleeve 16 to the latter of which a gear 17 is secured at each end. These four eccentrics 15 are spaced 90 degrees apart, and the gears 17 are mounted on roller bearings 18 upon the single throw of the crank shaft 14. The amount of throw in the crank shaft 14—that is the radial distance between the center of the crank shaft and the center of the counter shaft—is only one-fourth the stroke of the piston because the throw of the eccentric adds to the throw of the counter shaft to make up one-half of the stroke. Therefore it will be seen that the throw of the eccentric must be equal to the throw of the crank shaft. Each gear 17 meshes with an internal gear 19 which are keyed directly to the crank case housing 8. The pitch diameter of each internal gear 19 and the number of teeth are exactly double that of its small gear 17. The object in using two sets of gears—one at each end of the cluster of eccentrics 15—is to prevent any tendency to "roll" due to the flexibility of the crank shaft 14.

Due to the fact that the small gears 17 make two complete revolutions for each revolution of the crank shaft 14, the center of each eccentric 15 will travel back and forth in a perfect straight line with a stroke equal to the pitch diameter of the internal gear 19. Two counterweights 20 are used to balance the eccentrics 15.

Figure 2:
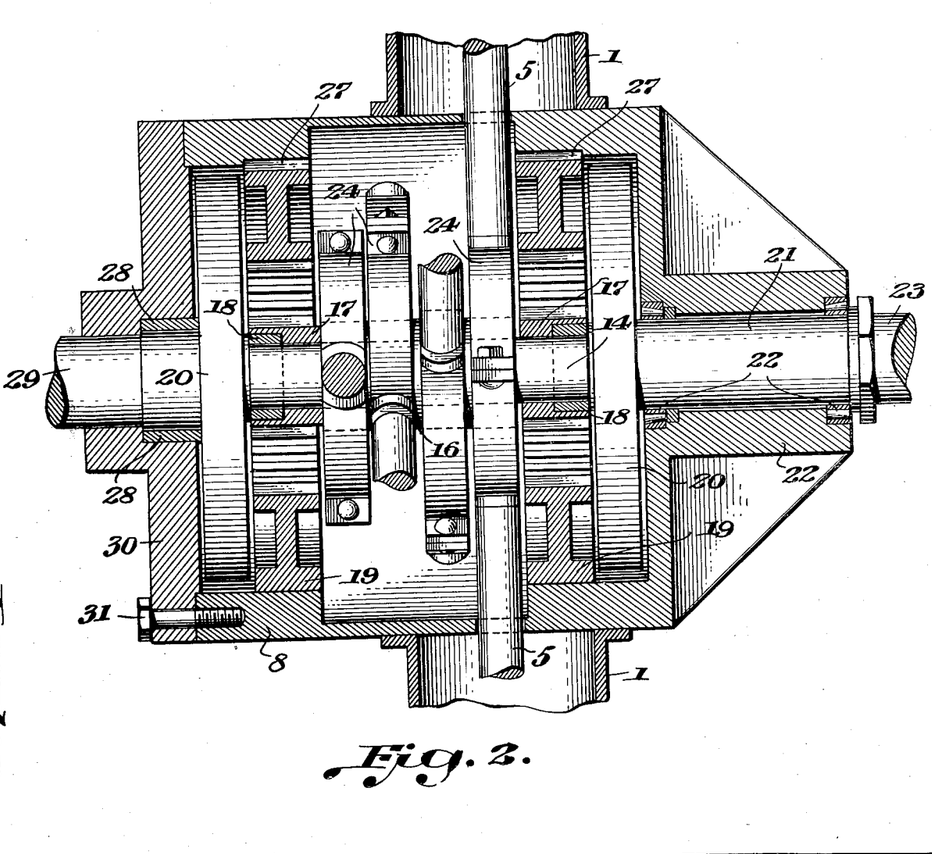
Fig. 2 is an axial section through the crank case.
Figure 3:
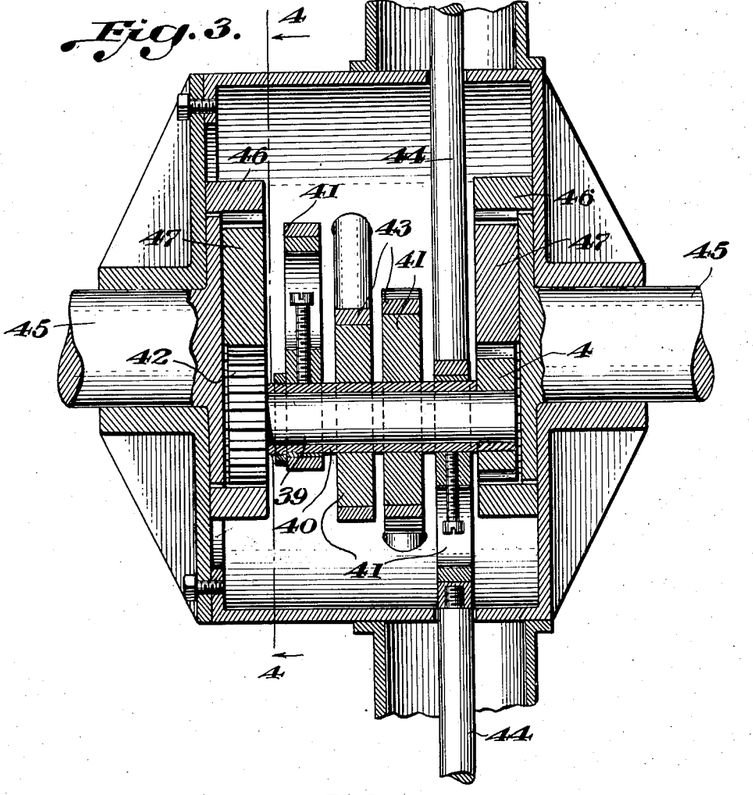
Fig. 3 is a cross-sectional view through the crank case and the eccentrics of another form of the invention.
Figure 4:
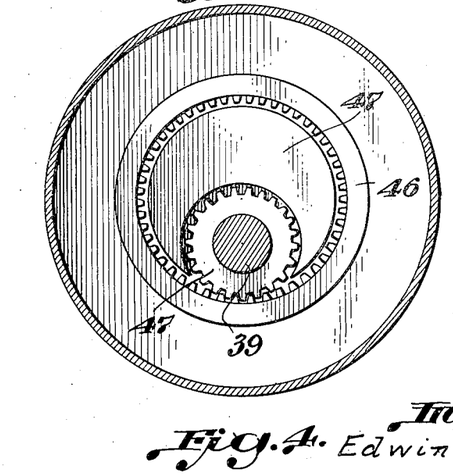
Fig. 4 is a side view partly in section taken on line 4—4 of Fig. 3.
Figure 5:
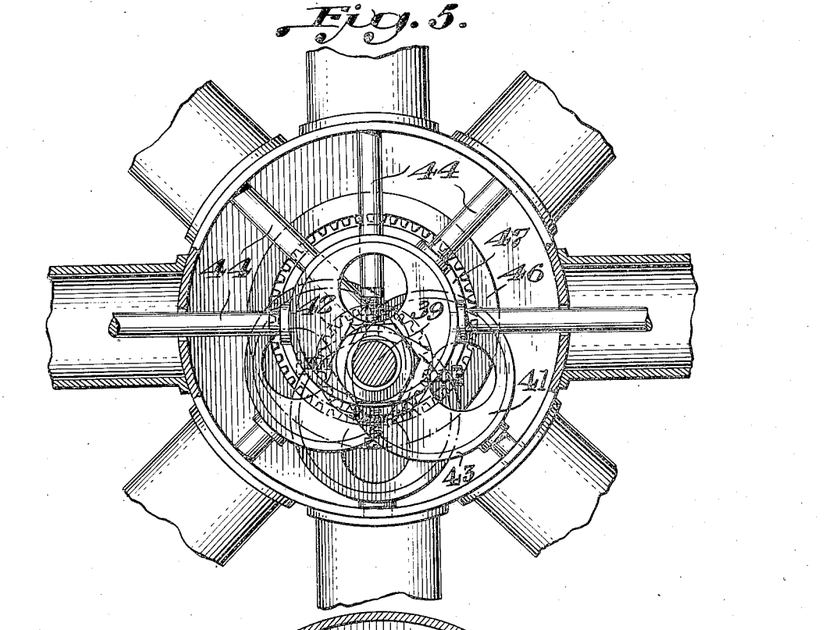
Fig. 5 is a front view of the engine showing the eccentrics and piston rods in a certain position.
Figure 6:
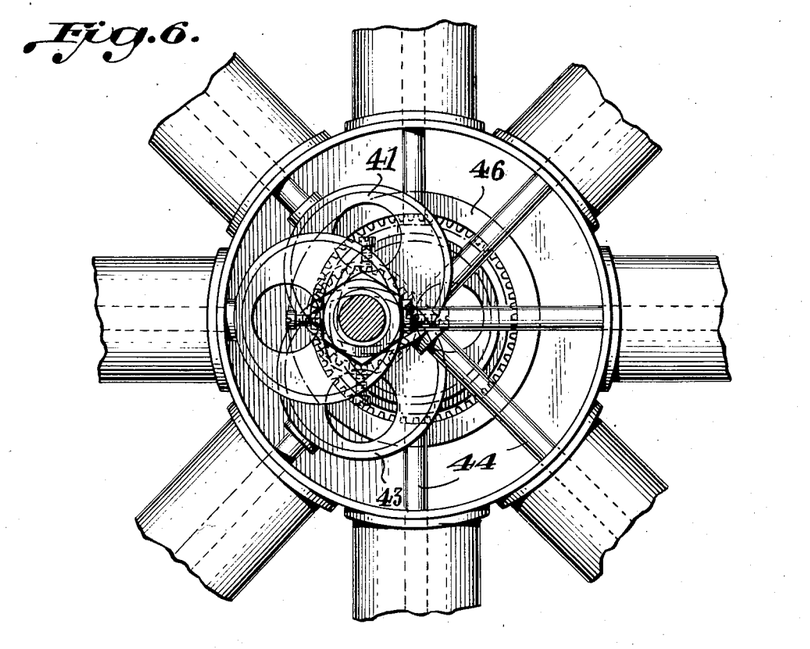
Fig. 6 is a view similar to Fig. 5 showing the eccentrics and piston rods in a different position.
Figure 7:
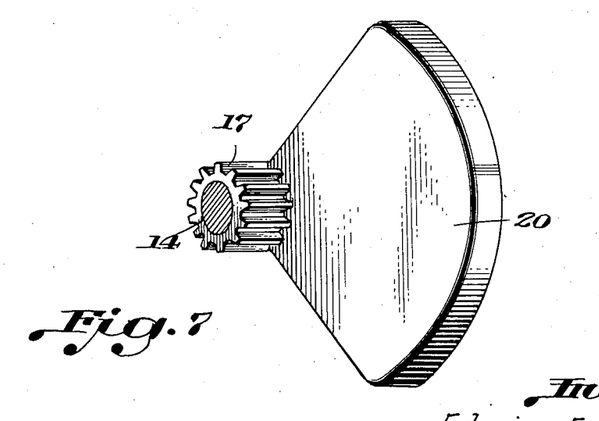
Fig. 7 is a perspective view of a counterweight and its gear of the engine of Figs. 1 and 2.
Figure 8:
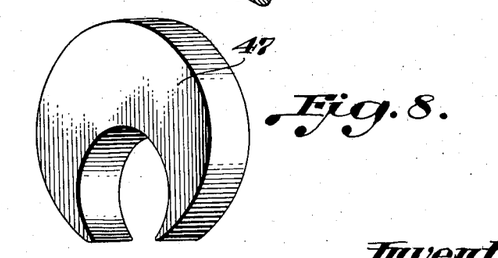
Fig. 8 is a perspective view of the counterweight of Fig. 4.

A counter shaft 21 mounted in roller bearings 22 is secured to the counter weight 20, Fig. 2 and this is the driven shaft from the crank shaft 14. A rather long bearing 22 is preferably provided which acts as a support for a driven member such as a propeller which is suitably mounted on the end 23.

As shown in Figs. 1 and 2 each pair of opposed piston rods are secured to a ring 24 which surrounds the periphery of its eccentric 15.

In Fig. 1 the piston in cylinder 1 is at the end of its compression stroke and the beginning of its power stroke. In this position, which can be readily visualized in connection with cylinder V, the intake port 9 is open and gas from a manifold (not shown) rushes into the vacuum created behind the piston and in chamber 10. In cylinder VIII the piston is one-fourth the way towards completion of its power stroke, and in this position all its ports are closed by the piston—thereby compressing the fuel mixture behind the piston. In cylinder VII the piston has traveled one-half of its power stroke, and the gas mixture below the piston is further compressed. In cylinder VI the piston has completed three-fourths of its power stroke. In cylinder V which is shown more in detail the piston 4 has fully completed its power stroke, and the exhaust port 26 is open, and the by-pass port 11 is also open so that the compressed gas mixture rushes from behind the piston, from chamber 10, through the by-pass 11 and is deflected upward by the baffle plate 25, filling the cylinder with new fuel and forcing out the exhaust into manifold 13. In cylinder II the piston has started upward on its compression stroke, and the ports 11, 26, and 9 are closed. In cylinder IV the piston is one-half way up of its compression stroke, and a vacuum is being formed below it. In cylinder II the piston is three-fourths way up of its compression stroke having formed a large vacuum behind the piston so that when the port 9 is open the gas from the intake manifold will rush in.

Each internal gear 19 is pressed into the crank casing or housing 8 and is secured in place by keys 27. The number of teeth on the internal gear 19 should be even rather than odd such as 32 for instance, since the number of teeth on the small gear 17 should be one half that number or 16.

A roller bearing 28 is provided between the shaft end 29 and the end plate or cover 30, which latter may be held in place by bolts 31. The other end of the crank case 8 is provided with bearings 22 which have rollers mounted at an angle to take care of the end thrust of the propeller. The roller bearings 18 on the counter shaft 14 support the small gears 17 and the eccentrics 15.

Fig. 1 shows a metallic packing 32 which is held tight by the collar 33 and the coil spring 34. This metallic packing is for each piston rod and in this manner the compression chambers 10 will be tight against leakage. Cylinders I and V are in the radial plane of the center line of eccentric 35, cylinders II and VI eccentric 36, cylinders III and VIII, eccentric 37, and cylinders IV and VII are in the same radial plane of eccentric 38.

In the form of invention of Figs. 3 to 6 and 8 the engine is shown somewhat diagrammatically but the operation is similar to the form just described. The crank shaft 39 (Fig. 3) is provided with a sleeve 40 on which are rigidly secured the eccentrics 41 and the small gears 42. Each eccentric 41 is provided with a ring 43 and two piston rods 44 similar to Figs. 1 and 2. The main driven shaft 45 is provided on each side with an internal gear 46 secured to the casing and which likewise has twice the number of teeth as gears 42. Each shaft 45 has a counter weight 47 secured thereto. As clearly seen in the two different positions of Figs. 5 and 6, the piston rods 44 follow only a reciprocating motion without any side thrust.

Figure 9:
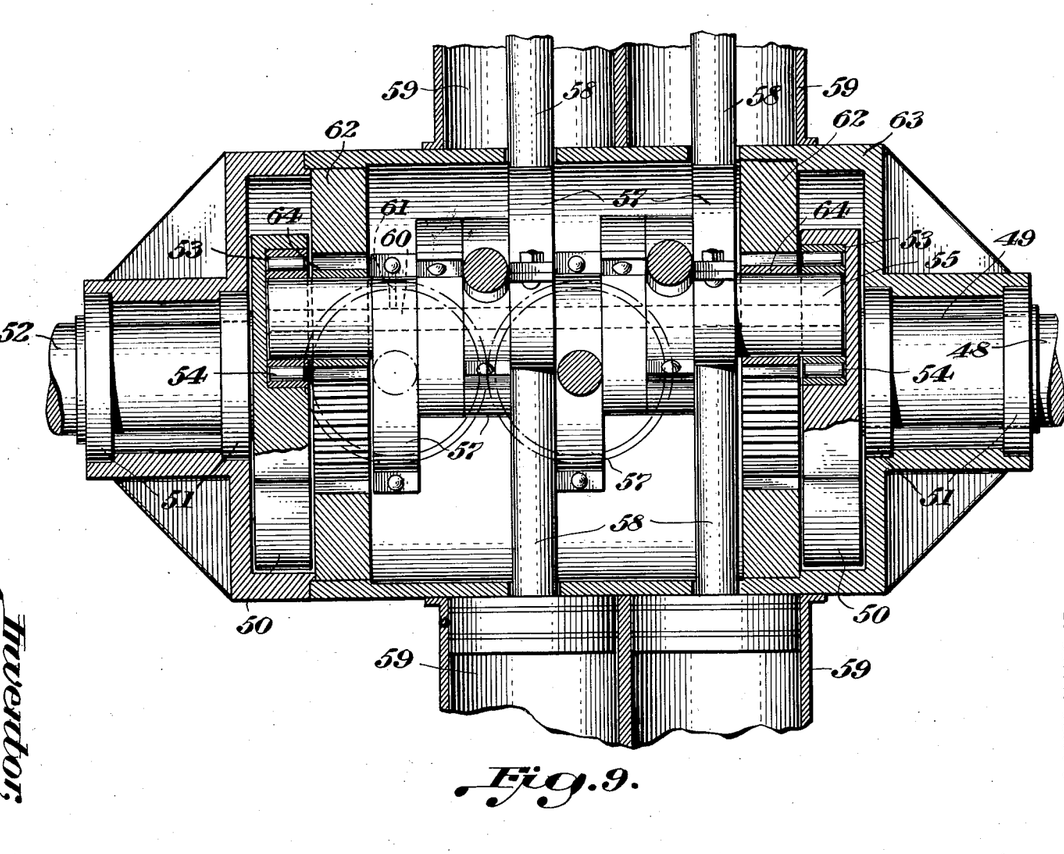
Fig. 9 is a longitudinal sectional view of a further modified motor.
Figure 10:
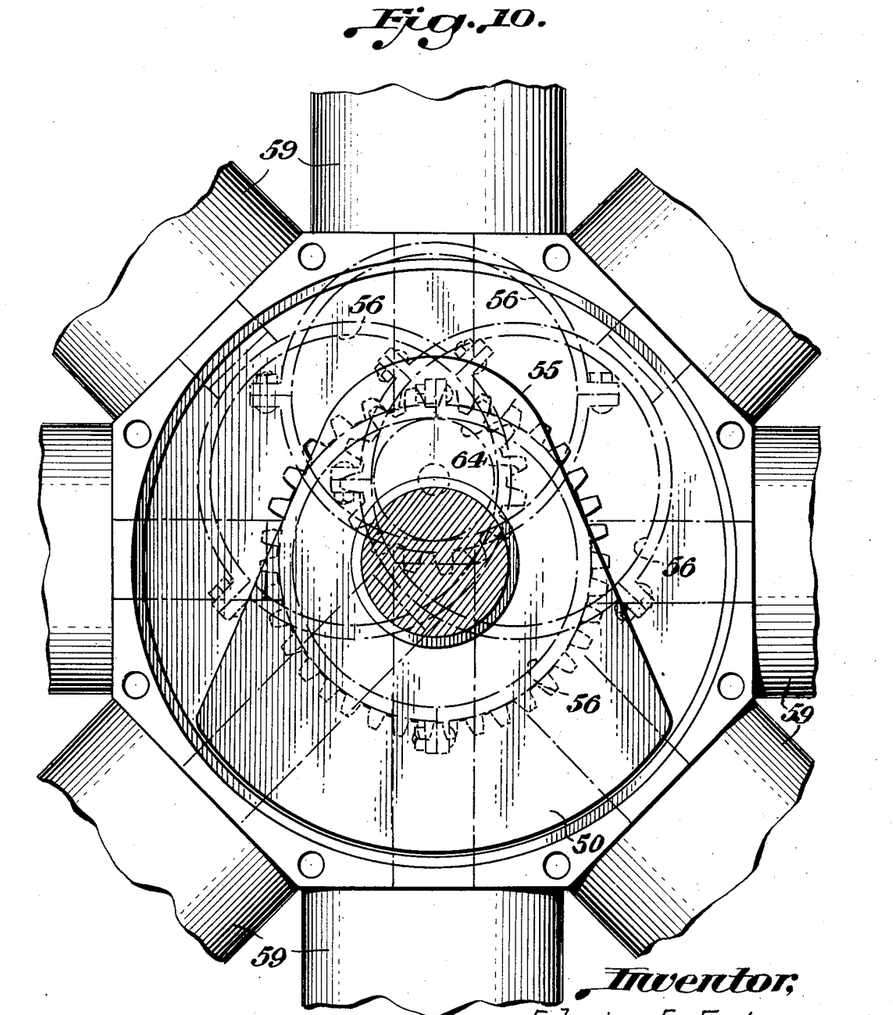
Fig. 10 is an end view of the motor of Fig. 9.

In the form of invention illustrated in Figs. 9 and 10 the crank shaft is a three piece crank shaft and the cylinders are provided in twin rows for a four-cycle operation so that an explosion in a cylinder will take place for each one-eighth revolution of the crank shaft. In the forms of invention of Figs. 1 to 3 a two-cycle-eight cylinder engine is disclosed and naturally in such engines the two rows of cylinders are not necessary.

Referring to Fig. 9 the power take-off end 48 of the main crank shaft 49 carries the counter-weight 50 and is mounted in roller bearings 51. The other end 52 of the crank shaft is similar to end 48 and is likewise mounted in roller bearings 51 and carries the counter-weight 50. Roller bearings of the well known "Timken" type are used in order to carry both radial and end thrusts. The recesses 53 are off-set in the crank shaft heads opposite the counter-weights 50 and the amount of this off-set is one-fourth the stroke of the piston. The roller bearings 54 are fitted into the recesses 53. The third part of the crank shaft is mounted between these bearings 54 and consists of a straight shaft 55 which has eight eccentrics 56 thereon made integral therewith, Fig. 10. Each eccentric 56 is provided with a ring 57 to which is secured two piston rods 58 and each eccentric is thus utilized as the crank throw for two opposed cylinders 59. The eight eccentrics are placed two in each quarter. A small bore 60 is bored straight through the shaft 55 and has small artery holes 61 for purposes of forced feed lubrication of the bearings.

Internal gears 62 are keyed to the crank shaft housing 63 and the pitch diameter of each internal gear is in this case 4 inches—which is the length of the piston stroke. Gears 64 are keyed to the shaft 55 and each meshes with its internal gear 62. The pitch diameter of each small gear 64 is exactly one-half the pitch diameter of the internal gears 62. Also each small gear 64 has exactly one-half as many teeth, so that with each revolution of the main crank shaft 48, 52 the small gears 64 meshing with the internal gears 62 will cause the shaft 55 carrying the eccentrics 56 to revolve two complete revolutions. The center of each eccentric will move back and forth in a perfectly straight line—thus relieving the cylinder walls from all side thrust.

The two small gears 64 are keyed directly to the shaft 55 and are in mesh with the internal gears 62 which are keyed to the housing 63—therefore both ends 48 and 52 of the main crank shaft are tied or secured together, and any tendency of either end to lag behind causes a plain twist in the shaft 55. Therefore if the shaft 55 and the crank case 63 are each made rigid, there can be no lag in either end of the main shaft.

As the power impulses are imparted from the pistons to the eccentrics 56 causing the shaft 55 to revolve the small gears 64 within the internal gear 62, both ends 48, 52 of the main crank shaft are forced to revolve. If all the load is taken from end 48, then the two pairs of gears at the opposite ends of shaft 55 will have loads in opposite directions. In other words the gears 62 and 64 at the left end of Fig. 9 will react against the tendency of the shaft 52 to lag. A further advantage of the three piece crank shaft is that it is much stronger than the sleeve construction of Fig. 3 and also the problem of assembly is made easier.

Figure 11:
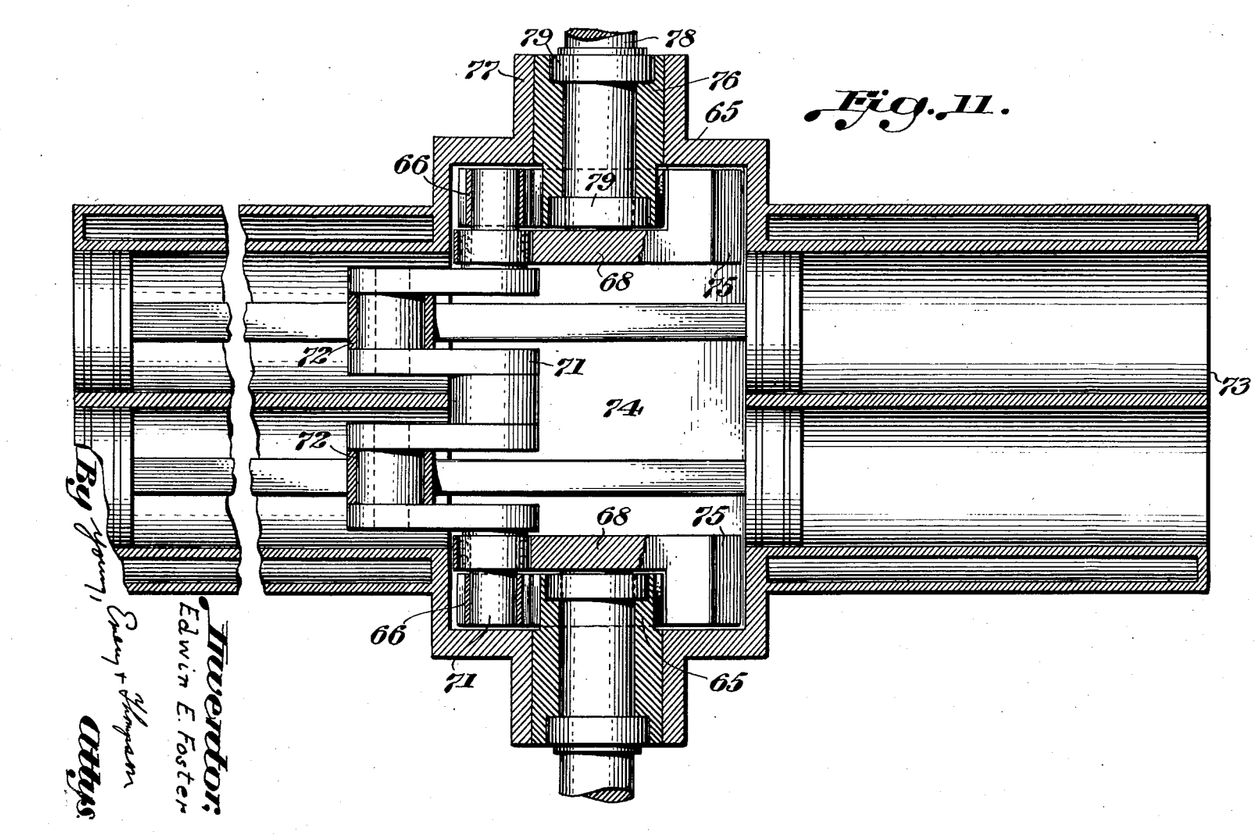
Fig. 11 is a longitudinal sectional view of another modified motor.
Figure 12:
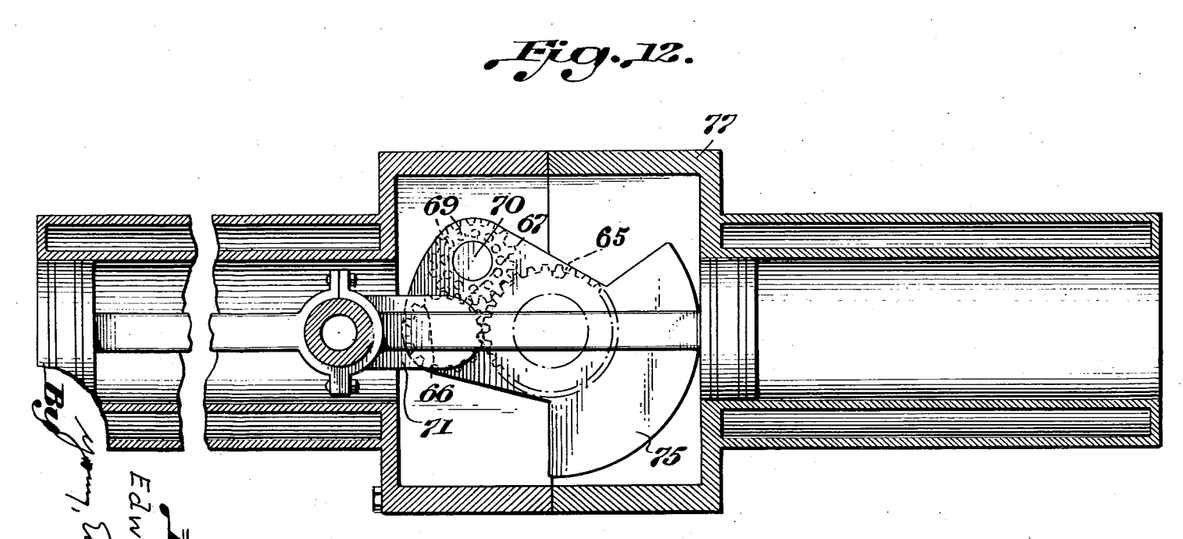
Fig. 12 is a cross sectional view of the motor of Fig. 11.

In the motor of Figs. 11 and 12 external gears instead of internal gears are utilized. The central gear 65 is stationary, and the counter shaft gear 66 and the idle gear 67 ride or move with the crank-shaft head 68. The idle gear 67 is mounted on ball-bearings 69 upon the stud 70 which is fixed to the crank-shaft head 68. The idle gear 67 is utilized to change the direction of rotation of the counter shaft gear 66 and may be of any convenient size. The counter-shaft gear 66 must have exactly one-half the pitch diameter of the stationary gear 65. The distance between gears 65 and 66 is not restricted to any fixed ratio to the size of the gears as in the case in the two modifications of Figs. 4 to 10 which utilize internal gears. Gears 65 and 66 may be spaced any distance apart so long as the idle gear 67 connects them to change their direction of rotation. It becomes apparent therefore, that any suitable connection between gears 65 and 66 can be used such as chains, belts, bevel-gears, bands, links, etc.

The crank-shaft 71 is utilized in place of eccentrics as in the previous modifications in order to keep down the size of the connecting rod bearing 72. As will be seen from the drawings, Figs. 11 and 12, the opposed type of cylinder arrangement 73 makes an ideal flat motor as the crank-case 74 is very compact in spite of the unusually long piston stroke. In the conventional motor the ratio of the stroke to the bore is limited due to the fact that the connecting rod enters at an angle. Usually the limit is about 3 to 5 for the bore and stroke respectively. In the motor of Figs. 11 and 12 the ratio is 2 to 6 and could be increased or decreased according to the particular ratio which may prove to be the ideal to utilize the full power of the explosion. Especially in the pump and compressor fields, it would be desirable to have a small bore and a long stroke and this would accomplish the purpose of the two stage compresser now commonly used.

75 denotes the counter-weights. The gear 65 is integral with the sleeve 76 which is keyed to the housing 77. The drive shaft 78 is mounted in the sleeve 76 by means of "Timken" bearings 79. The amount of throw of the countershaft must be equal to the distance between the centers of gears 65 and 66.

Figure 13:
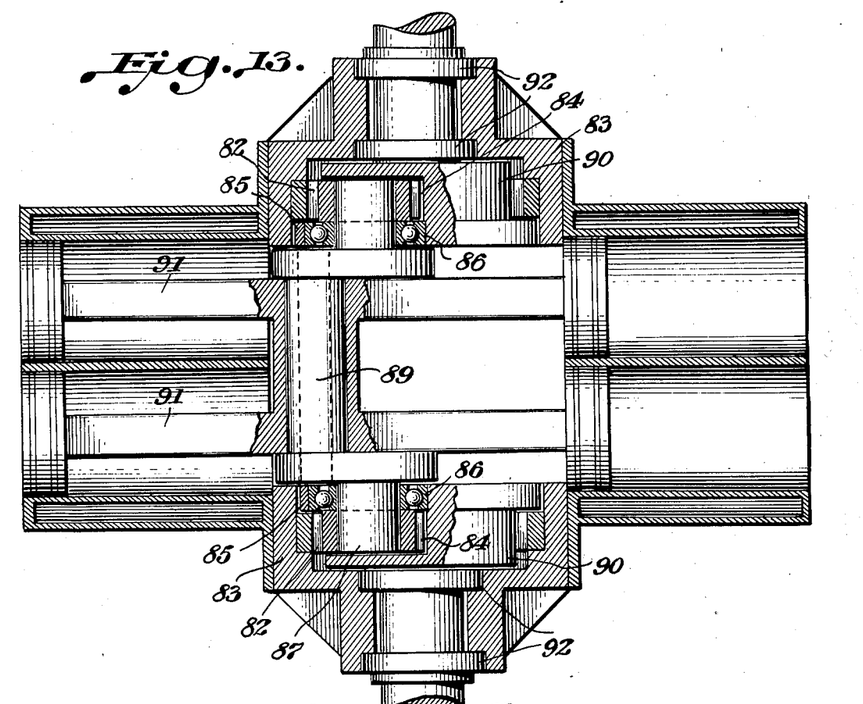
Fig 13 is an axial sectional view of still another modified engine.
Figure 14:
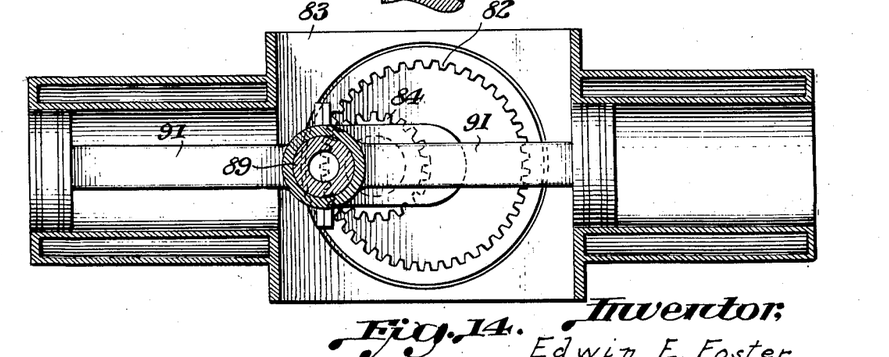
Fig. 14 is a cross-sectional view through the engine taken on line 14—14 of Fig. 13.

Figs. 13 and 14 illustrate a four cylinder, four cycle, opposed type of motor in which internal gears are used to obtain straight line motion. There is also provided a three piece crank shaft having all four connecting rods placed and travelling on a single throw of the countershaft. The engine preferably has a five inch stroke and a three inch bore. In this construction the internal gear 82 is keyed to the countershaft housing 83 and meshes with the gear 84. The countershaft head 85 carries the outside race of the ball bearing 86, and the main shaft 87 of the countershaft fits into the inside race of the bearing 86. The small gear 84 is keyed to the countershaft 87. The sleeve bearing 88 has the four connecting rods 91 fixed thereto and this sleeve rides on the throw 89 of the countershaft 87. As will be seen from Fig. 13 this construction places the bearing 86 between the gear 84 and the countershaft throw 89 so that the distance between the two bearings 86 on the countershaft 87 can be as short as possible. The counterweight 90 counterbalances the weight of the countershaft and both ends of the motor are identical. The "Timken" bearings 92 take care of both radial and end thrust of the countershaft heads.

I claim as my invention:

1. A mechanical movement comprising a reciprocable rod, a crank shaft, an eccentric mounted on said shaft, a ring for securing the rod on the eccentric with relative motion between said means and the eccentric, said ring surrounding the peripheral surface of the eccentric, means whereby the crank shaft and the eccentric describe rotary and circular motions and the rod describes a straight line reciprocatory motion, said means including an internal gear and an external gear intermeshing with each other, and a counterweight secured to the crank shaft.

2. A mechanical movement, comprising a circular casing, a crank shaft mounted in the casing, a plurality of rods radially arranged in the casing in opposite pairs and adapted to reciprocate in the casing, an eccentric for each pair of rods and having a ring to permit rotation thereof, said ring surrounding the peripheral surface of the eccentric, and means in the casing and mounted on the crank shaft whereby the rods exert only forces in the direction of their straight line reciprocation and the rods are free of all side thrust, said means including an internal gear and an external gear intermeshing with each other, and a counterweight secured to the internal gear and partly surrounding the external gear.

3. A mechanical movement according to claim 2, in which the crank shaft is in three sections having at each end of the intermediate section a connecting element.

EDWIN E. FOSTER.